United States Patent [19]

Green

[11] Patent Number: 5,247,762
[45] Date of Patent: Sep. 28, 1993

[54] HYDRAULIC PLANTER SYSTEM

[76] Inventor: Evert S. Green, 2740 Yacht Club Blvd., Ft. Lauderdale, Fla. 33304

[21] Appl. No.: 861,202

[22] Filed: Mar. 31, 1992

[51] Int. Cl.⁵ ............................................ A01G 25/00
[52] U.S. Cl. ............................................ 47/79; 47/80
[58] Field of Search ................ 47/80, 81, 48.5, 79

[56] References Cited

U.S. PATENT DOCUMENTS

| | | | |
|---|---|---|---|
| 627,231 | 6/1899 | Hinrichs | 47/80 |
| 777,791 | 12/1904 | Johnson | 47/80 |
| 1,214,356 | 1/1917 | Natvig | 47/80 |
| 2,964,877 | 12/1960 | Canding | 47/80 |
| 4,435,918 | 3/1984 | Shain | 47/80 |

FOREIGN PATENT DOCUMENTS

| | | | |
|---|---|---|---|
| 5674 | of 1886 | United Kingdom | 47/80 |
| 2131663 | 6/1984 | United Kingdom | 47/79 |

*Primary Examiner*—Henry E. Raduazo
*Attorney, Agent, or Firm*—Malin, Haley, DiMaggio & Crosby

[57] ABSTRACT

A controlled release hydraulic watering system for either an individual plant pot or for a plurality of potted plants. The system utilizes a porous terra cotta water-receiving reservoir which, through permeation, can distribute water either into an individual potted plant at a controlled release rate without over-watering the plant contained therein or onto a capillary sheet and horticultural matting used in an irrigating tray containing a plurality of potted plants providing a proper amount of water to the tray for watering all the plants contained therein. The terra cotta reservoir may include an exterior side wall covering of horticultural matting, silica sand and a plastic sheet.

3 Claims, 2 Drawing Sheets

HYDRAULIC PLANTER SYSTEM

BACKGROUND OF THE INVENTION

1. Field of the Invention

This invention relates to the controlled release irrigation of potted plants and, in particular, to a controlled release hydraulic watering apparatus for insertion into the soil in a conventional individual plant pot or for mounting a controlled release water reservoir on a nursery or home plant pot support tray for individually potted plants, the tray having a capillary sheet for irrigation in the tray bed.

2. Description of the Prior Art

It is well known that plant growth and health is dependent upon carbon dioxide, nutrients, and, most importantly, a proper amount of water. To reach and gather water and nutrients, each individual plant employs an intricate network of roots for obtaining the proper amount of moisture within the surrounding plant soil. Potted plants present a problem in that the root structure is confined within the plant pot, making the survival of each plant dependent upon the moisture directly made available within the confines of the plant pot or its surrounding environment. Typically, if a plant gets an over-abundance of water, the plant may drown, even in an irrigated system, in that plants often overcompensate if too much water is available by trying to store water for dry periods, resulting in a drowning of the plant. Obviously, if the soil lacks sufficient water, the plant will ultimately not survive.

The applicant herein has developed numerous devices as shown in the prior art that basically provide for continual irrigation, especially of individually potted plants. Disclosed in my U.S. Pat. Nos. 3,220,144 and 3,193,970 are devices for controlling and regulating water to a single plant. My U.S. Pat. No. 3,778,928 teaches an irrigation system for controlling irrigation to a plurality of plants in individual containers. In my U.S. Pat. No. 4,245,434, I disclose a further improvement in a system for the irrigation of soil in plant containers characterized by the use of a capillary sheet having a plurality of evenly spaced perforations with a layer of silica sand acting as capillaries, as described in the capillary sheet used in U.S. Pat. No. 4,001,968. The objective in these devices is to provide proper irrigation to plants.

In the present invention, I have found that a reservoir for water can be employed that is constructed of a terra cotta or similar clay material having a comparable permeability and can be used for metering out through the terra cotta wall a controlled release of the proper amount of water to be used by a plant, either in an individual potted plant or with multiple individual potted plants that are mounted on a tray that uses a capillary sheet or plastic strips in conjunction with horticultural matting. Thus, the invention disclosed herein has two different modes of operation.

In its simplest form, the present invention uses a terra cotta water reservoir that is shaped like an inverted truncated cone with an open top and closed base that holds water, the reservoir being mounted within, or a large portion within, existing soil in even a larger plant pot to provide controlled release of water placed in the terra cotta reservoir. Applicant has found that the use of terra cotta or perhaps a comparable permeable clay provides a proper amount of permeation of the water from inside the terra cotta container reservoir that permeates through the terra cotta wall into the surrounding environment at a desirable rate, offering sufficient moisture and water to the plant or surrounding plant tray without over-watering for proper health of the plant. Another advantage is that with open top reservoirs, a visual inspection of the amount of water in the reservoir is easily and quickly accomplished. Finally, the controlled release system using the terra cotta reservoirs is also inexpensive in that terra cotta plant pots are currently being manufactured in large scale and all that needs to be done is to have the bottom hole plugged for the reservoir to function in accordance with the entire system in the present invention.

SUMMARY OF THE INVENTION

A controlled release apparatus for irrigating one or more potted plants, either individually or in groups, that allows hydraulic watering of each plant pot based on the natural permeation of water contained within a terra cotta reservoir and its permeation through the terra cotta wall to a surrounding area, including soil in a plant pot or into an irrigating tray for potted plants having plastic perforated capillary sheets and horticultural matting for transfer of water throughout the tray area.

In one embodiment, the system comprises a terra cotta or similar water-permeating clay receptacle that functions as a water liquid nutrient reservoir of a predetermined size in volume mounted within the potting soil in an individual plant pot (of a much larger size) with the size of the terra cotta reservoir being adopted for the size of the individual large plant pot and the type of plant in the pot to be watered. In this embodiment, the terra cotta reservoir may be shaped as a truncated cone having an open top and a closed bottom and closed sides so that it basically holds water (and nutrients) except for permeation. The terra cotta reservoir is placed down into the soil of the potting soil in the plant pot to a desired vertical level depending on the anticipated water demand. The reservoir is then filled with water to a desirable level and the entire control release system is then ready for operation. Water in the terra cotta reservoir will permeate at a controlled release rate through the terra cotta into the surrounding soil to be made available for the plant within the pot. The terra cotta reservoir may then be visually inspected as to the amount of water remaining in it. Filling the reservoir, however, does not over-water the plant. Applicant has determined that, based on the proper size reservoir made of terra cotta in conjunction with the proper plant and pot size, just the right amount of water will permeate into the potting soil for use by the plant to produce a healthy plant.

In a primary alternate embodiment, the control release system is achieved using multiple potted plants in accordance with applicant's U.S. Pat. No. 4,001,968 which shows an irrigation tray having capillary sheets using silica sand attached along one side and horticultural matting as a liner, both of which are used to transmit water from a flooding reservoir throughout the tray. In the present invention, applicant has determined that using a terra cotta reservoir (inverted cone) having an open top and a closed base will allow water to permeate into the plastic layer of capillary sheets at a controlled release amount that is suitable for watering numerous potted plants that are mounted on the capillary sheets throughout the tray. The size of the terra cotta reservoir will be a function of the number of potted plants and the tray size and tray area. In a secondary alternate embodiment, a plastic capillary sheet and horticultural mat may be placed around the exterior surface of the terra cotta reservoir with the plastic sheet having an adhesive and a silica sand layer that is in contact with the horticultural mat which contacts the outside surface of the terra cotta reservoir to allow additional water to permeate the side walls of the terra cotta reservoir being attracted through the capillary sheet and matting action, drawn to the base of the terra cotta reservoir, where the water will be deposited on the tray capillary sheets for transfer throughout the tray to an array of potted plans wherein the pots have access apertures in their bases. Thus, in the secondary alternative embodiment, the control release system is comprised of a terra cotta reservoir having a capillary sheet and horticultural matting layer mounted around its outside surface, the capillary sheet having silica sand attached by adhesive with the terra cotta reservoir being mounted at a predetermined place in and on top of the capillary sheet that is used for the irrigating tray. Numerous potted plants (and plant pots) can be disposed around the tray. Each of the pots must have at least one hole in the bottom for transfer of water to the plants from the tray capillary sheet.

It is an object of this invention to provide a controlled release hydraulic system for individual plants mounted in one or more plant pots.

It is another object of this invention to provide a controlled release hydraulic system for watering individual plants in pots that utilizes terra cotta or a similar clay permeation reservoir to achieve the controlled release characteristics so as to prevent over-watering of plants mounted in individual pots or in an irrigation tray.

Yet still another object of this invention is to provide an improved controlled release irrigation system for use with an irrigation tray that contains a plurality of plant pots having holes in their base which are mounted on a capillary sheet in the base of the tray.

In accordance with these and other objects which will become apparent hereinafter, the instant invention will now be described with particular reference to the accompanying drawings.

DESCRIPTION OF THE PREFERRED EMBODIMENTS

Figure 1:
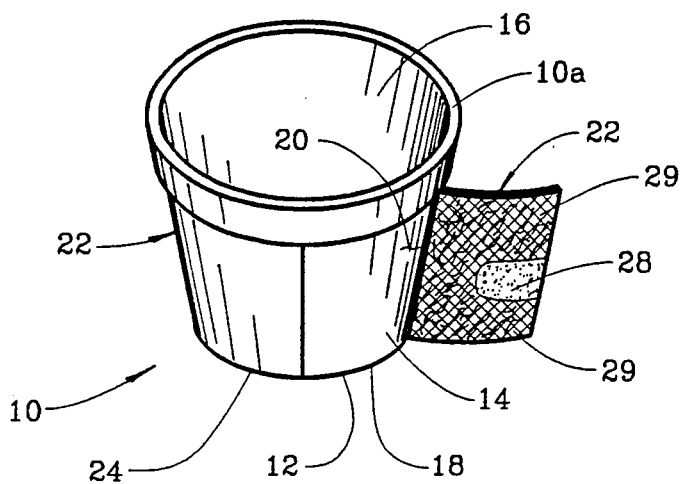
FIG. 1 is a perspective view of the terra cotta receptacle used with the controlled release system in accordance with the present invention.
Figure 2:
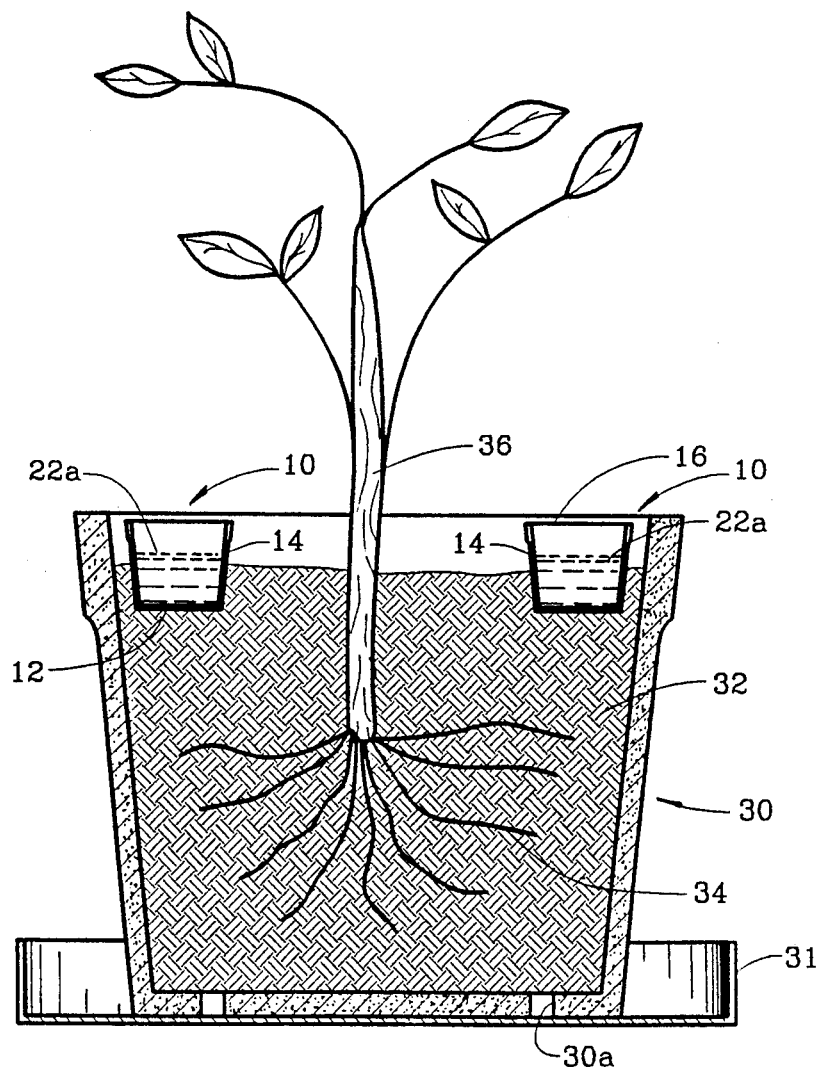
FIG. 2 is a side elevational view in cross-section of the present invention.

Referring now to the drawings, and specifically FIGS. 1 and 2, the present invention is comprised of a terra cotta frustoconical water receptacle or reservoir 10 having an open top 10a, closed bottom 12, and a curved conical closed side wall 14 integrally formed therein. The terra cotta reservoir 10 is water permeable and is used in plant pots or pot trays to meter water and nutrients, with or without capillary sheet cover 22. The reservoir 10 may include an outside cover 22 made of a plastic sheet 24 having a sand silica layer 28 on the inside, attached by an adhesive (such as found on contact paper) and a layer of horticultural matting 29. The plastic covering 22 is shown partially pulled away in FIG. 1 to show the inside sand and matting layers. In use, the plastic cover extends completely around the outside wall (not on the bottom surface). The plastic cover 22 may be used with the irrigation tray and is described below as a secondary alternate embodiment.

Referring to FIG. 2, two reservoirs 10 are mounted in a conventional plant pot 30 having potting soil 32. In addition, water 22a is shown in the terra cotta receptacles 10 mounted in the conventional plant pot 30. The plant pot 30 includes holes 30a in the bottom of the pot. The entire pot 30 may be mounted on any suitable surface or in a pot holder 31.

The terra cotta reservoirs 10 in FIG. 2 containing water 22 act as a controlled water release system in conjunction with the surrounding potting soil 32 so that water 22a permeates through from the inside to the outside of the terra cotta reservoirs 10 through the walls 14 and through the base wall 12 (FIG. 1), which does not have any opening, at a proper control rate based on demands caused by the dryness or wetness of the potting soil 32 which cooperates with the reservoirs 10 for watering plant 36. Using the present invention, one or more reservoirs 10 may be placed in the particular pot, depending on the size of the plant pot 30 and the particular nature of the plant 36 which utilizes water. Some plants may require more water and, therefore, more individual reservoirs may be utilized. Small individual reservoirs 10 can be constructed or larger ones can be used, depending on the size of the pot 30. It should be determined strategically, however, that there is a proper combination of reservoirs 10 (surface area exposed to the soil) in conjunction with the size of the plant pot 30 and the particular plant 36 being used. Each reservoir 22 can be adjusted vertically in depth (surface area) relative to soil 32 and soil top 38 to control the release of water depending upon the type of plant and its water requirements.

Figure 3:
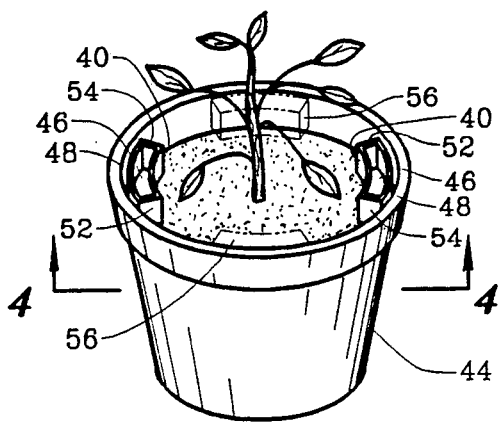
FIG. 3 is a perspective view of an individual plant pot using the hydraulic system in accordance with the present invention.
Figure 4:
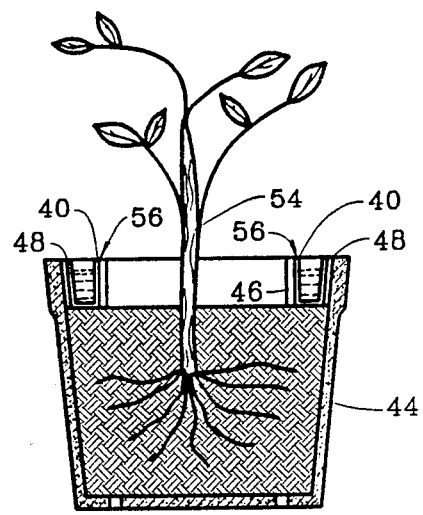
FIG. 4 is a side elevational view in cross-section of the embodiment shown in FIG. 3.

FIG. 3 shows an alternate modification in the shape of the reservoir 10 as shown in FIG. 1, i that arcuately shaped reservoirs 56 (shown in phantom) may be utilized as shown in FIG. 3 in a plant pot 44, which takes advantage of the circular interior shape of the plant pot 44 to reduce the overall cross-section or diameter of the terra cotta reservoir. As shown in FIG. 3, a typical reservoir 56 may include an interior curved wall 40, an exterior larger radius of curvature wall 48, with flat end walls 52 and 54, and a closed bottom 46. As shown in FIGS. 3 and 4, two or more individual three-dimensional arcuate shaped reservoirs 56 may be used to fit snugly around the interior periphery of the individual plant pot 44, the number used depending again on the size of the pot, the size of the reservoirs, and the particular plant to be watered, depending on its water demand.

Figure 5:
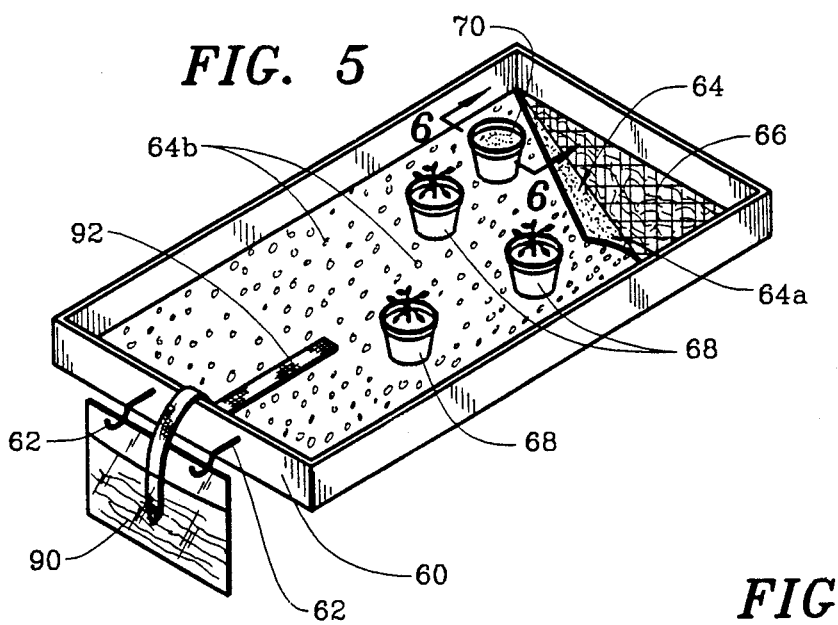
FIG. 5 shows an alternate embodiment in perspective of the present invention used for hydraulic irrigation of a plurality of individually potted plants mounted in a tray having a capillary sheet.

Referring now to FIG. 5, the primary alternate embodiment of the invention is with a terra cotta reservoir 70, identical in construction with the reservoir 10 of FIG. 1, placed in an irrigation tray 60 which is a water impervious box having raised side walls around its periphery and includes a plastic perforated capillary sheet 64 and horticultural liner matting 66. Sheet 64 also includes silica sand 64a lining the bottom of plastic perforated sheet with adhesive and with perforations 64b throughout, all of which engage the base opening holes in pots 68 which contain plants. The water reservoir 70 in tray 60 in FIG. 5 is constructed in accordance with the terra cotta reservoir shown in FIG. 1 primarily without a cover 22 and is filled with water which permeates out along the bottom surface at a proper controlled release rate so that the plants in pot 68 receive the proper amount of moisture through a controlled release of water contained in reservoir 70. A constant drainage wick 92 is employed to reduce stagnation and promote a concentration gradient from the terra cotta reservoir to plants and wick 92. Excess water drains by gravity into a plastic bag 90 mounted by metal hooks 62 to the side wall of tray 60. The main purpose of wick 92 is to drain off unnecessary surface water.

Figure 6:
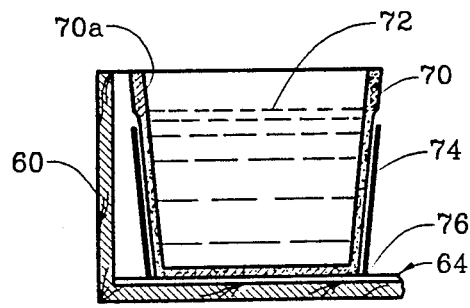
FIG. 6 is a cutaway cross-sectional view in elevation of a modified reservoir utilized with the irrigation tray in accordance with the present invention.

FIG. 6 shows a secondary alternate embodiment with reservoir 70 having capillary sheet 74 surrounding its exterior periphery that includes silica sand and plastic, which allows the water to permeate out through the side wall of terra cotta reservoir 70 and then flow downward by capillary action and gravity where it contacts the capillary mat 62 mounted in the bottom of tray 60 (FIG. 5) for the distribution of water to the various potted plants. Note that the terra cotta reservoir 20 shown in FIG. 1 and its equivalent reservoir 70 shown in FIG. 6 do not have holes in the bottom, but are closed along the bottom and contain a terra cotta wall 70a that allows water to permeate onto the tray capillary matting 62 for proper distribution through the tray 60. The bottom edge 76 represents the meeting place of the bottom edge of capillary sheet 74 and capillary sheet 64 in the tray bottom. Water within the reservoir 70 permeates onto the inside surface of cover capillary sheet 74 and is transferred onto tray capillary sheet 64. Note primarily the reservoir 70 is used in tray 60 without an exterior cover 74 depending on the amount of water transfer necessary for the plants in pots in tray 60. The capillary sheet 64 in tray 60 could be replaced with individual capillary strips lining the bottom of the tray. Each strip is a perforated plastic with silica sand and horticultural matting.

Thus, applicant has shown two separate embodiments, a new and improved method and apparatus for sustaining controlled release hydraulic watering and irrigation of individually potted plants, in such a manner as to prohibit over-watering which could deleteriously affect each plant in each pot, while at the same time insuring that each plant is properly watered and can be monitored by visual inspection.

It has been determined that the use of terra cotta permits the proper permeation of water from the inside of the terra cotta receptacle based on the exterior contact, such as the potting soil or the matting and silica sand, capillary sheet surrounding the reservoir, to allow water to permeate through the wall. It is conceivable that other permeable clay or clay-like materials having a comparable permeability for water transfer could be utilized in lieu of terra cotta. Also, it is possible that different shapes of the terra cotta reservoir can be utilized and employ a more or less exterior surface area for beneficial controlled release.

What is claimed is:

1. A controlled release hydraulic irrigation system for use in combination with a potted plant, said irrigation system comprising:

porous, terra cotta, water-permeable reservoir formed in a truncated conical shape of a conventional plant pot having a solid bottom wall and an outwardly sloping continuous side wall sealably attached to said bottom wall leading to an open top, said bottom wall and said side wall having an inner surface and an outer surface, said inner surface defining a water reservoir therein; and capillary irrigation plastic sheet mounted around the outer surface of said continuous side wall, said sheet having a plurality of perforations placed uniformly therethrough and silica sand spatially adhering to one side of the sheet;

whereby placement of water into said defined reservoir provides permeating of water at a controlled release rate into said capillary sheet for distribution about said silica sand for distribution and absorption into soil juxtaposition to said sheet.

2. The irrigation system according to claim 1, wherein said potted plant is mounted in a plant pot having soil therein and a soil level and wherein a majority of said outer surface of said side wall is below the soil level of said potted plant allowing absorption of water through said capillary sheet of said side wall directly into the soil of said potted plant.

3. The irrigation system according to claim 1, wherein said potted plant is mounted in a conical plant pot having soil therein and a soil level, said plant pot including an annular rim having an inner diameter, and wherein said reservoir shape conforms to the inner diameter of said plant pot and is disposed beneath the rim of said pot.

* * * * *